UNITED STATES PATENT OFFICE.

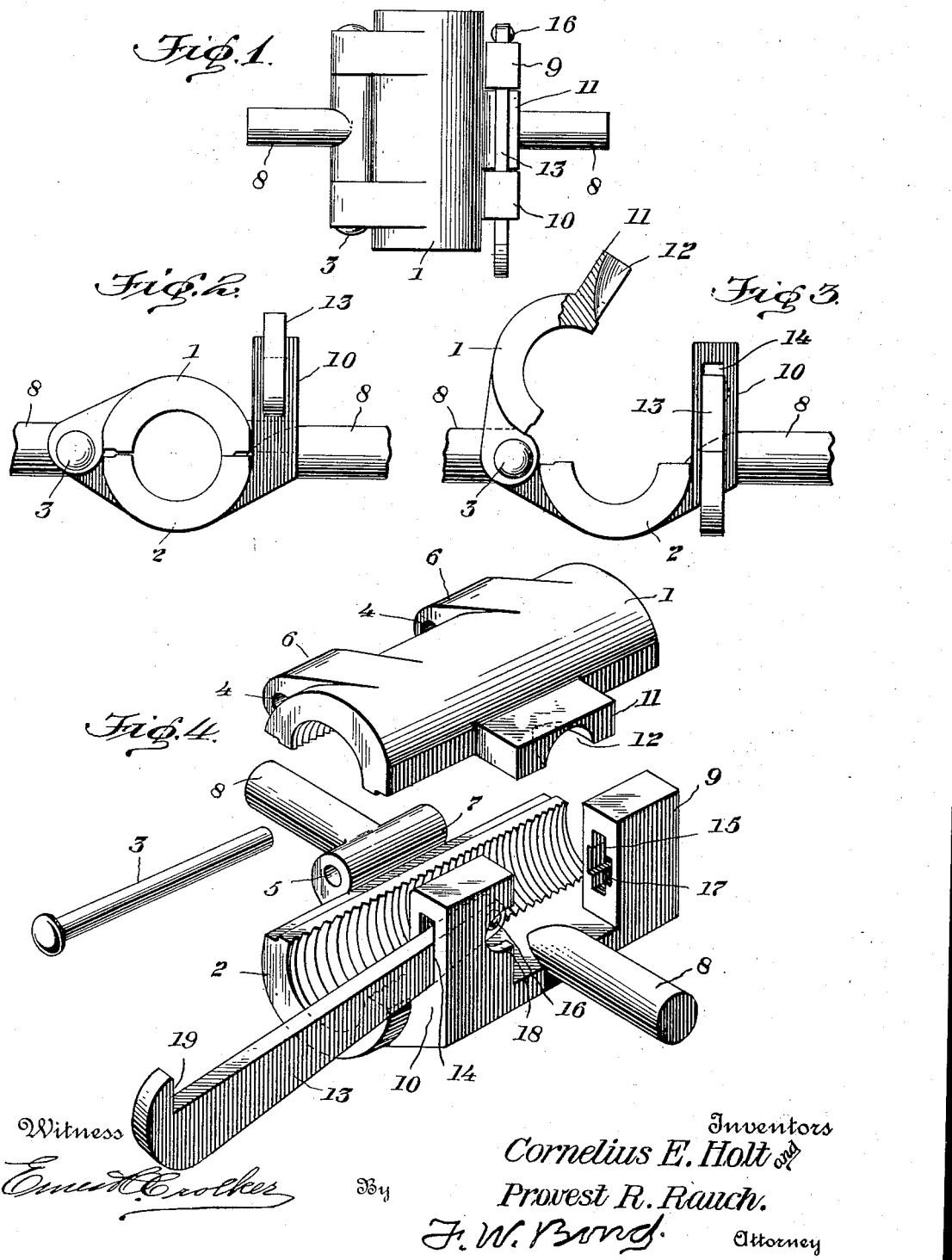

CORNELIUS E. HOLT, OF WASHINGTONVILLE, AND PROVEST R. RAUCH, OF LEETONIA, OHIO, ASSIGNORS TO THE LEETONIA TOOL COMPANY, OF LEETONIA, OHIO, A CORPORATION OF OHIO.

FASTENER FOR SECTIONAL COAL-AUGER NUTS.

1,195,018.  Specification of Letters Patent.  Patented Aug. 15, 1916.

Application filed May 12, 1916. Serial No. 97,072.

*To all whom it may concern:*

Be it known that we, CORNELIUS E. HOLT and PROVEST R. RAUCH, citizens of the United States, CORNELIUS E. HOLT residing at Washingtonville, in the county of Columbiana and State of Ohio, and PROVEST R. RAUCH residing at Leetonia, in the county of Columbiana and State of Ohio, have invented a new and useful Fastener for Sectional Coal-Auger Nuts, of which the following is a specification.

Our invention relates to improvements in fasteners for sectional coal auger nuts, in which means are provided for fastening the sections of the nut in proper position, and in such a manner that the drill or auger can be fed as the same is rotated.

The objects of the present invention are, first, to hold the hinged sections together, and second, to so locate the trunnions, that their axes will lie in substantially the same plane as the axis of the nut proper, and third, to provide means whereby a portion of one of the trunnions is utilized to securely hold the hinged nut sections against lateral movement. These objects, together with other objects readily apparent to those skilled in the art, may be attained by the construction illustrated in the accompanying drawings, although the invention may be embodied in other forms, the construction illustrated being chosen by way of example.

In the accompanying drawing: Figure 1 is a top view. Fig. 2 is an end view showing the sections closed. Fig. 3 is a similar view showing the sections open. Fig. 4 is a view showing the different parts detached and in position to be properly assembled.

Similar numerals of reference indicate corresponding parts throughout all the figures of the drawings.

In the accompanying drawing 1 represents the hinged nut section or member and 2 the trunnion or body member, which members are hinged together, preferably by a hinge pin 3 located through the apertures 4 and 5 formed in the connecting flanges 6 and 7. The trunnion section 2 is provided with the trunnions 8, which are located in alinement with reference to each other and upon opposite sides of the section 2. The trunnions 8 are for the purpose of properly journaling the device in the usual way. One side of the section 2 is provided with the spaced flanges 9 and 10 and between said flanges is located one of the trunnions 8, said trunnion being so located that its axis will lie in a plane with the axis of the sections 1 and 2; that is to say the axis of the sections as they rotate with the rotation of the trunnion. It will be understood that the opposite trunnion should be in proper alinement with the trunnion extended laterally between the flanges 9 and 10.

For the purpose of providing means for securely holding the sections 1 and 2 in closed position and upon the screw threaded drill shank (not shown but common and well understood) the hinge section 1 is provided with the laterally extended flange 11, which is formed of a width to correspond substantially with the width or distance between the inner edges of the flanges 9 and 10. The flange 11 is provided with the recess 12, which is for the purpose of receiving that portion of the trunnion lying between the flanges 9 and 10 whereby a portion of the lateral strain is removed from the flanges 9 and 10.

For the purpose of forcing the sections 1 and 2 together the wedge shaped key 13 is provided, which key is located through the slots 14 and 15 when brought into position to securely clamp the sections together.

It is well understood that where a detachable key is employed it is liable to become lost or misplaced and in order to prevent any accidental detachment of the key when not in use to clamp the sections, said key is provided with the cross pin or head 16. The slot 15 is provided with the opposite side groove 17, whereby the pin 16 is permitted to pass through the slot 15. The flange 10 is provided upon its inner face with the recess or cut out portion 18, thereby permitting the end of the key 13 to be drawn into such a position that it will not interfere with the closing and opening of the sections 1 and 2, owing to the fact that said key will not come in contact with the edge of the flange 11 when placed between the flanges 9 and 10 or removed therefrom. For the purpose of removing the key 13 or bringing the key into the position shown in Fig. 4 its head end should be provided with the strike flange 19.

Having fully described our invention what we claim as new and desire to secure by Letters Patent, is:

1. In a device of the character described, the combination of hinged sections, one of the hinged sections provided with trunnions, their axes located in the same plane as the axis of the hinged sections, said section provided with spaced flanges, said space flanges provided with slots, one of the flanges provided with grooves upon opposite sides of its slot, the other section provided with a flange adapted to be located between the spaced flanges, a wedge shaped key adapted for longitudinal movement through the slots in the flanges said key provided with a cross pin.

2. In a device of the character described, the combination of hinged sections, one of the hinged sections provided with trunnions, their axes located in the same plane as the axis of the hinged sections, said section provided with spaced flanges said flanges provided with slots, one of the flanges provided with grooves upon opposite sides of its slot, the other section provided with a flange adapted to be located between the spaced flanges, a wedge shaped key provided with a cross pin, said wedge shaped key adapted for longitudinal movement through the slots of the flanges, and one of the flanges provided with a cut out portion adapted to receive the cross pin.

In testimony that we claim the above, we have hereunto subscribed our names.

CORNELIUS E. HOLT.
PROVEST R. RAUCH.

Copies of this patent may be obtained for five cents each, by addressing the "Commissioner of Patents, Washington, D. C."